United States Patent [19]

Ebernard

[11] Patent Number: 4,546,758
[45] Date of Patent: Oct. 15, 1985

[54] SOLAR-TOWER POWER STATION

[75] Inventor: Franck Ebernard, Hannberg, Fed. Rep. of Germany

[73] Assignee: Kraftwerk Union Aktiengesellschaft, Mülheim, Fed. Rep. of Germany

[21] Appl. No.: 668,684

[22] Filed: Nov. 5, 1984

Related U.S. Application Data

[63] Continuation of Ser. No. 381,131, May 24, 1982, abandoned, which is a continuation of Ser. No. 182,230, Aug. 28, 1980, abandoned.

[30] Foreign Application Priority Data

Sep. 17, 1979 [DE] Fed. Rep. of Germany ....... 2937529

[51] Int. Cl.[4] .............................................. F24J 3/02
[52] U.S. Cl. .................................. 126/451; 126/419; 126/438; 60/641.15
[58] Field of Search ............... 126/419, 420, 424, 425, 126/421, 422, 438, 439, 451; 60/641.15

[56] References Cited

U.S. PATENT DOCUMENTS

| | | | |
|---|---|---|---|
| 3,927,659 | 12/1975 | Blake | 126/438 |
| 3,976,508 | 11/1978 | Mlavsky | 126/443 |
| 4,044,753 | 8/1977 | Fletcher | 126/438 |
| 4,121,566 | 10/1978 | Radenkovic | 126/420 |
| 4,137,899 | 2/1979 | Weslow | 126/440 |
| 4,146,789 | 3/1979 | Neale | 250/203 R |
| 4,209,007 | 6/1980 | Collins | 126/419 |

Primary Examiner—James C. Yeung
Attorney, Agent, or Firm—Herbert L. Lerner; Laurence A. Greenberg

[57] ABSTRACT

Solar-tower power plant, including a tower having a base and an upper end, an array of mirrors disposed around the base of the tower, a solar heater being disposed at the upper end of the tower and having a cavity formed therein defining a wall adjacent to the cavity, the cavity wall having a radiation input opening formed therein defining an edge of the cavity wall, the solar heater being heatable by radiation reflected and concentrated by the mirror array and received through the radiation input opening, a first coolant loop connected to the solar heater for utilizing radiation heat therefrom, a second coolant loop, a radiation heat exchanger having tubes and being connected to the second coolant loop, the radiation heat exchanger being disposed at the edge of the cavity wall and having a surface being disposed outside the cavity wall and facing the mirror array.

14 Claims, 9 Drawing Figures

SOLAR-TOWER POWER STATION

This application is a continuation, of application Ser. No. 381,131, filed May 24, 1982, now abandoned, which is a continuation of Ser. No. 182,230, filed Aug. 28, 1980, now abandoned.

The invention relates to a solar-tower power station with a tower which supports a cavity-type solar heater at its upper end, to which a loop or conduit for a coolant to utilize solar heat is connected. An array of mirrors reflects and concentrates the solar radiation onto a radiation input opening of the cavity.

Such a solar-tower power station is seen, for instance, in an advertisement in the magazine "Atomwigtschaft" of July, 1979, page A 187. The solar cavity heater has the purpose of absorbing the radiation from the mirror array as completely as possible and of minimizing the back radiation which emanates from its interior, so that the losses, especially at higher temperatures such as are desirable for cyclic thermodynamic processes, do not reduce the efficiency of the facility. As a result, one endevors to make the radiation input opening as small as possible.

However, the smallness of the radiation input opening requires a very accurate alignment of all mirrors of the mirror array, so as to obtain a focal spot of the reflected radiation which is focused as sharply as possible and is adapted accurately to the cross section of the radiation input opening. Even so, it could hardly be expected in practice that a sudden jump in the radiation density would be obtained at the edge of the radiation input opening.

Instead, there will be a statistical distribution of the radiation density which also irradiates the edge zone and thereby leads to radiation losses.

It is accordingly an object of the present invention to provide a solar-tower power station which overcomes the hereinaforementioned disadvantages of the heretofore-known devices of this general type, and to utilize these radiation losses of the mirror array at the edge of the radiation input opening and to thereby improve the efficiency of such a solar-tower power station.

With the foregoing and other objects in view there is provided, in accordance with the invention, a solar-tower power plant, comprising a tower having a base and an upper end, an array of mirrors disposed around the base of the tower, a solar heater being disposed at the upper end of the tower and having a cavity formed therein defining a wall adjacent to the cavity, the cavity wall having a radiation input opening formed therein defining an edge of the cavity wall, the solar heater being heatable by radiation reflected and concentrated by the mirror array and received through the radiation input opening, a first coolant loop connected to the solar heater for utilizing radiation heat therefrom, a second coolant loop, a radiation heat exchanger having tubes and being connected to the closed cycle of the second coolant loop, the radiation heat exchanger being disposed at the edge of the cavity wall and having a surface being disposed outside the cavity wall and facing the mirror array.

The radiation heat exchanger makes an increase of the efficiency of the system possible because radiation losses which otherwise occur on the outside of the cavity wall at the edge of the radiation input opening, are included in the cycle as useful heat. Recuperation of additional radiation losses which occur due to movements of the mirror array (for instance, due to wind loads on the mirrors or by vibratory motions of the tower) relative to the radiation input opening act in the same direction.

The invention further reduces the cost of the facility because the narrow angle tolerances for the alignment accuracy of the individual mirrors of the mirror array can be made larger, and the stray radiation which occurs with imprecise focusing beyond the edge of the radiation input opening no longer is lost.

Finally, an increase of the system safety for the tower platform is obtained by a heat-shield effect of the radiation heat exchanger which, in the event of an accident, can be forced-cooled with high throughput and can therefore be kept at a permissible maximum temperature.

In accordance with another feature of the invention, there are provided means for disconnecting the radiation heat exchanger from the second coolant loop and connecting it to the first coolant loop.

In accordance with a further feature of the invention, the radiation heat exchanger is adapted to the cross section of the radiation input opening and covers the edge of the cavity wall over a width of at least one-tenth and preferably one-quarter of the inside diameter thereof. Inside width is understood here to mean the maximum width of the radiation input opening, which may be circular, oval or even rectangular. In this connection, it can be stated generally that the ring area which is to be covered by the radiation heat exchanger around the edge of the radiation input opening, will depend on the degree of attainable focusing and thus on the radiation intensity which is still to prevail at the edge of the radiation input opening.

In accordance with an added feature of the invention, the tubes of the radiation heat exchanger are heat pipes. These are, as is well known, elongated hollow bodies in which a heat exchange medium is transported in the liquid phase by capillary action from a condensation zone to an evaporation zone and from there, having absorbed heat, flows back to the condensation zone, where the heat is given off.

In accordance with an additional feature of the invention, the heat pipes include a condensation and an evaporation zone, the condensation zone being disposed above the evaporation zone and out of the reflected radiation.

In this way the return flow is aided by gravity, outside of the reflection radiation. To this end, it may be brought out of the surface of the evaporation zone and may, in particular, be bent off from the edge of the evaporation zone toward the cavity into the shadow region.

In accordance with yet another feature of the invention, there are provided large-area elements disposed in vicinity of the tubes of the radiation heat exchanger for influencing heat transfer to the tubes by at least one of heat conduction and back radiation.

Thus, provision can be made, for instance, through the reflection surfaces that the tubes of the radiation heat exchanger are brought away from the edge in the low-intensity region to a temperature approximately as high as in the region near the edge. On the other hand, provision can be made by using cover surfaces for radiation energy from the area near the edge to travel to the region of the radiation heat exchanger further removed from the edge by heat conduction.

Large-area elements which improve the heat absorption of the radiation heat exchanger also include fins which surround the tubes, in a manner known per se, transversely to their longitudinal direction, especially in helix-fashion. The large-area elements can furthermore serve to equalize the heating of the tubes of the radiation heat exchanger, i.e., to bring thermal energy from the side facing the reflection radiation to the rear side of the tubes, which faces away from the former.

In accordance with yet a further feature of the invention, the radiation heat exchanger has additional surfaces, and there are provided selectively absorbing and emitting coatings disposed on at least one of the first-mentioned and additional surfaces. By using such coatings, which can be applied to the base metal forming the tubes of the heat exchanger by special surface treatments, provision is made that the radiation absorption of the heated parts of the heat exchanger is maximized and the radiation loss is minimized. The possibility of coating is not confined to the tubes themselves but extends also to the large-area elements associated with them.

In accordance with yet an added feature of the invention, there are provided photo-electric semiconductor elements, so-called solar cells, disposed in vicinity of the radiation heat exchanger.

In accordance with yet an additional feature of the invention, the semiconductor elements are forced-cooled by the tubes of the radiation heat exchanger. In this way their temperature remains in a range which is photoelectrically favorable. In this manner, even relatively weak radiation components at the end of the radiation heat exchanger removed from the edge can still be utilized for the production of energy.

Otherwise, different constructions of tubes and large-area elements associated therewith can also be combined. Therefore, it can be said in general that the material properties as well as the geometrical arrangement of the surfaces of the radiation heat exchanger are chosen so that through the interaction of the light absorption, light reflection, light scattering, heat radiation, heat conduction and convection, the desired photothermal conversion of radiation into useful heat which can be taken away with the coolant, is maximized. The rule applies in this context that the tube surfaces are provided with selectively absorbent coatings which absorb heavily in the range of visible radiation but emit only little in the infrared radiation range, while the large-area elements associated with the tubes, depending on their purpose, may exhibit the same or even the opposite radiation behavior.

In accordance with still another feature of the invention, there is provided a highly temperature resistant glass cover having between one and two layers and being disposed on the radiation heat exchanger for reducing convection losses, the glass cover having expansion gaps formed therein forming segments, and a lateral edge seal disposed on the glass cover.

In accordance with still a further feature of the invention, the glass cover is highly permeable in the visible radiation range, and there is provided a selective coating disposed on at least part of the glass cover for reducing heat radiation and making the glass cover less permeable in the infrared heat radiation range. The glass cover will be made to fit the shape of the radiation heat exchanger.

In accordance with still an added feature of the invention, there are provided means for compensating expansion of the tubes of the radiation heat exchanger and means for securing the tubes. In this manner, the thermal expansions, which are unavoidable in operation, can best be taken into consideration.

In accordance with still an additional feature of the invention, there are provided large-area elements surrounding the edge of the cavity wall, the large-area elements being subdivided by expansion gaps formed therein in at least one of a direction along the edge and transverse thereto, into sectors and/or segments. This produces sectors or segments so that the thermal expansions occurring at these individual parts can be managed.

As already explained, the radiation heat exchanger may be an additional part which is fastened to the outer wall on the mirror array side of the cavity solar heater, so that it can be made in the factory or at least prefabricated, and also can be replaced easily.

In accordance with again another feature of the invention, the radiation heat exchanger is formed as part of the cavity wall at least partly in the plane of the input opening formed therein, and the radiation heat exchanger is heated directly by the reflected radiation and by radiation in the cavity.

In principle, it is endeavored to make the form of the radiation heat exchanger as simple as possible in the interest of easy manufacture. However, it may also be entirely advantageous if in accordance with again a further feature of the invention, the tubes of the radiation heat exchanger are disposed around the input opening in the form of a three-dimensional spatially-curved ring surface. It can therefore be achieved that the radiation extending beyond the edge, which is to be utilized by the radiation heat exchanger, arrives at particularly favorable angles. Otherwise, in accordance with again an added feature of the invention, the tubes of the radiation heat exchanger are disposed in a plurality of layers offset relative to each other within the scope of any configuration thereof.

In accordance with again an additional feature of the invention, the tubes of the radiation heat exchanger are combined in a tube bundle extended parallel or transverse to the edge of the cavity wall. The flow through the tubes of the tube bundle is then parallel, and they are connected to a common feed and discharge line through manifolds.

If the direction of the flow is from the region away from the edge to the region near the edge, a maximum coolant temperature is obtained because the radiation intensity and therefore the temperature at the edge of the radiation input opening is highest. If, on the other hand, the coolant flows conversely, from the edge to the region away from the edge of the radiation heat exchanger, the heat absorption is maximized because the gradient is greater, i.e., the difference between the temperature of the coolant and the tube wall temperature. It may therefore be advisable in accordance with another feature of the invention, to provide means for selectively connecting the tube bundles for use as a preheater section and an evaporator section and a superheater section, depending on the temperature of coolant. To this end, different connecting lines with controlled valves can be provided. Otherwise, tube geometries can also be chosen for reasons of production, thermal rating expansion compensation etc., which are constructed spirally, lengthwise, transversely in the form of a meander path or otherwise in accordance with known forms of steam generator construction and are made stress-free by likewise known compensation means.

In accordance with a further feature of the invention, there is provided a ring area of the cavity wall adjacent to the edge thereof, the tubes of the radiation heat exchanger being combined into a plurality of tube bundles, each of the tube bundles covering a part of the ring area.

In accordance with an added feature of the invention, the tube bundles are selectively connectible in parallel and in series depending on the intensity of the reflected radiation. In this way, the radiation intensity which is different in the morning, at noon and in the evening, can always be optimally coupled into the process.

In accordance with an additional feature of the invention, there are provided means for selectively connecting the tube bundles for use as a preheater section and an evaporation section and a superheater section, depending on the temperature of coolant.

In accordance with yet another feature of the invention there are provided means for reversing the direction of flow of coolant in the radiation heat exchanger relative to the input opening.

In accordance with yet a further feature of the invention, at least one of the tubes of the radiation heat exchanger is a measuring line, and there are provided measuring sensors for temperature and mass flow connected to the at least one measuring line.

In accordance with yet an added feature of the invention, several distributed tubes of the radiation heat exchanger are in the form of a measuring line for determining the reflected radiation extending at a given distance beyond the edge of the cavity wall.

In accordance with yet an additional feature of the invention, all of the tubes of the radiation heat exchanger are connected together in the form of a measuring line for calorimetric measurement of all of the reflected radiation. In this manner, even the intensity of the radiation which goes beyond the edge can be determined, which, without the invention, would have to be called a radiation loss, so that the full intensity of the total mirror array radiation becomes measurable.

In accordance with again a further feature of the invention, there is provided a process computer connected to the measuring line for controlling the mirror array.

In accordance with again another feature of the invention, there is provided a control loop, preferably equipped with a process computer, for optimising heat utilization of the radiation heat exchanger, the measuring line being part of the control loop. With such a process computer, provision can be made that the solar heat which is obtained by the radiation heat exchanger and varies throughout the day, is optimally coupled into a gas and/or steam process with constant or variable temperature level and correspondingly matched mass flow of the coolant. Thus, the daily cycle energy can be maximized and the annual average efficiency improved. The same process computer can also be used to perform temperature-limit monitoring in cooperation with the radiation heat exchanger through the measuring lines of the latter and, in the event of disturbances, to cause fast defocusing of the mirror array, to assure the safety of the installation.

Therefore, in accordance with a concomitant feature of the invention, there are provided safty connection means for increasing coolant flow in the tubes of the radiation heat exchanger if operated above a given permissible temperature limit.

Other features which are considered as characteristic for the invention are set forth in the appended claims.

Although the invention is illustrated and described herein as embodied in a solar-tower power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
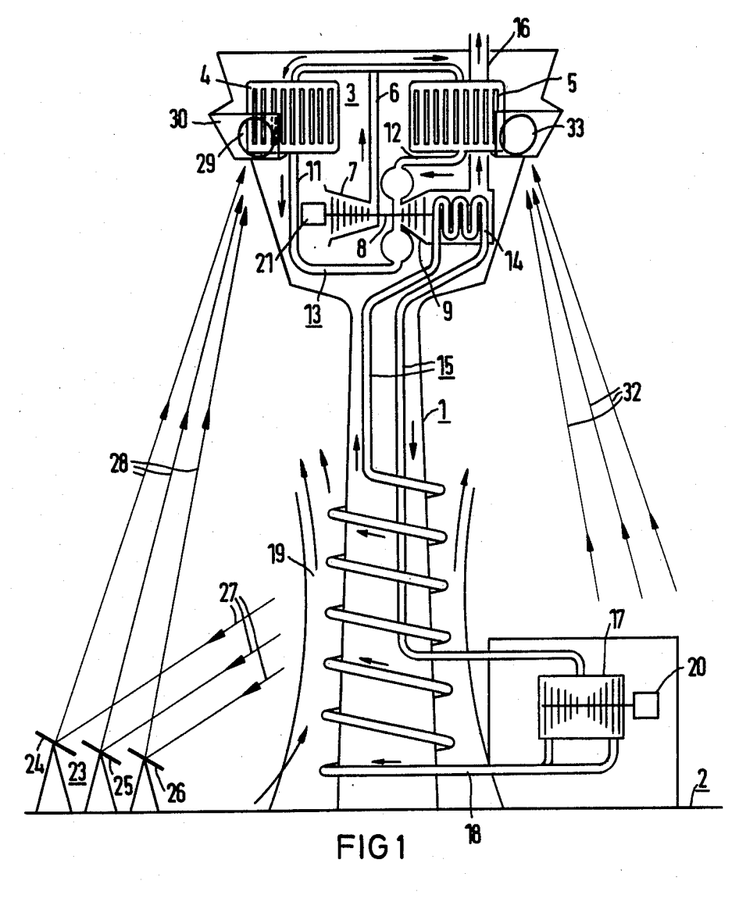
FIG. 1 is a diagrammatic side-elevational view of a solar-tower power station.

Referring now to the figures of the drawing and first particularly to FIG. 1 thereof, it is seen that the solar-tower power station includes a tower 1 which rises, for instance, at least 40 m above ground level 2. At its upper end 3, the tower supports one or more cavity-type solar heaters 4 and 5. The solar heaters are, in principle, bundles of tubes that are distributed in a large area, which absorb solar heat and give it to a coolant which flows through the tubes. To this end, the solar heaters are connected in parallel to the output line 6 of a compressor 7, which in the illustrated embodiment example circulates air as the coolant.

The compressor 7 is connected by a shaft 8 to a gas turbine 9. Hot gas lines 11 and 12 of the two solar heaters 4 and 5 lead to the gas turbine 9. In the course of its loop or conduit 13, after the gas turbine 9, the hot gas (air) which leaves the lines 11, 12 and drives the gas turbine 9 passes a heat exchanger 14 of a steam loop or conduit 15 before it leaves the chamber 3 or upper end of the tower through an exhaust air stack 16. The gas loop 13 is then closed from the free atmosphere, from which the compressor 7 draws.

From the steam loop 15 it can be seen that the live steam line leading downward from the heat exchanger, which serves as a steam generator, ends at a steam turbine 17 mounted on the ground 2. Steam leaving the turbine 17 is conducted through a line 18 to a dry cooling tower 19, which is structurally combined with the tower 1, as shown. At the tower 19 the coolant is condensed and is transported as feedwater back to the heat exchanger 14.

The steam turbine 17 drives an electric generator 20 with an output rating of, say, 6 MWe. Besides the compressor 7, a generator 21 with a nominal power of, say 14 MWe is connected to the shaft 8 of the gas turbine 9.

The solar heaters 4 and 5 are acted upon by the two symmetrical mirror array segments which are disposed at the base of the tower 1. Of these, there is shown only the schematically illustrated individual mirrors 24, 25 and 26 for one mirror array segment 23, which direct the incident parallel sun rays 27 toward the solar heater 4 as focused reflected radiation 28 through a radiation input opening 29 in a wall 30 of the cavity. A similarly focused reflected beam 32 acts on the solar heater 5 through a second radiation input opening 33.

Figure 2:
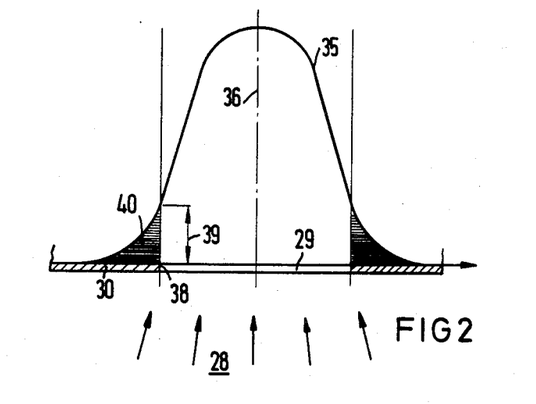
FIG. 2 is a fragmentary diagrammatic and graphical view of the typical distribution of the reflected radiation in the vicinity of a radiation input opening.

FIG. 2 shows, in a simplified view, the cavity wall 30 with the opening 29 formed therein and the reflected radiation 28 incident thereon. The local intensity of the radiation 28 is plotted in the form of a Gaussian curve 35, assuming rotation-symmetrical spatial distribution. It is seen that the intensity is at a maximum in the vicinity of the axis 36 of the circular radiation input opening 29 shown in dot-dash lines, but does not become zero in step-fashion at the flanks; it rather still has an intensity value of, say, ¼ of the maximum intensity as designated with reference numeral 39, even at the edge 38 of the radiation input opening 29. The radiation extending beyond the edge 38, which is shown in FIG. 2 by the corner area 40 under the intensity curve 35, has as the integral of the curve 35 in the embodiment example, about one-tenth the magnitude of the radiation passing through the radiation input opening 29.

Figure 3:
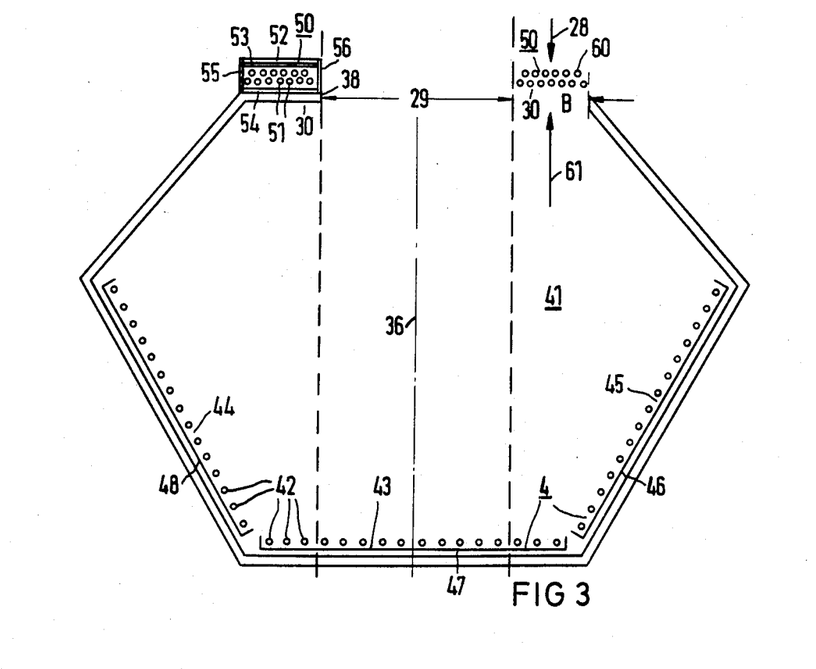
FIG. 3 is a diagrammatic cross-sectional view through a cavity-type solar heater and the radiation input opening with the radiation heat exchanger according to the invention.

FIG. 3 shows, in a horizontal-sectional view, a cavity-type solar heater 4 having a cavity 41 with a hexagonal cross section, which is disposed at the top of the tower of the solar-tower power station according to FIG. 1. The cavity 41 contains inner tubes 42 which, as shown in FIG. 3, together have a U-shaped or approximately semicircular cross section, because the vertical tubes 42 form a bridge or web-like region 43 and two legs 44 and 45 with three tube walls that are disposed symmetrically to the axis 36. Reflection surfaces 46, 47 and 48 are associated with the web 43 and the legs 44 and 45.

Located opposite the tube wall 43 of the solar heater 4 is the radiation input opening 29 in the cavity wall 30. Two embodiments of the edge 38 of the opening 29 in the wall 30 are shown to the right and the left of the dot-dash center line, which coincides with the axis 36. A radiation heat exchanger 50 which surrounds the radiation input opening 29 in ring-fashion is associated with the radiation input opening 29.

In the embodiment to the left in FIG. 3, the radiation heat exchanger 50 includes a two-layer bundle of tubes 51 disposed in an offset manner; the layers being located on the outside of the cavity wall, parallel thereto. The tubes 51 are provided with a one or more layer glass cover 52. The glass cover 52 has a coating 53 which has selective transmissivity on the side thereof facing the tubes. It is desirous as little transmissivity as possible in the infrared radiation range while the transmissivity should be as high as possible in the visible radiation range so that the energy of the reflected radiation 28 reaches the tubes 51. This may be done with selectively absorbing and emitting coatings.

The radiation heat exchanger 50 shown on the left side in the cross section according to FIG. 3, also has a large-area element 54 on the side thereof facing the cavity wall 30 which is formed of ceramic material or of metal. The element 54 serves the purpose of letting the radiation, as far as it misses the tubes 51 or emanates therefrom, return to the tubes 51 by direct reflection or by scattering. At the time, the large-area element 54, especially if it is in the form of a ceramic plate, can form heat insulation if this is desired. The side portions 55 and 56 provide a lateral seal of the radiation heat exchanger 50.

In the embodiment according to the right side of FIG. 3, a two-layer tube bundle 60 of the radiation heat exchanger 50 is disposed in place of the cavity wall 30. The tube bundle 60 is therefore, on the one hand, acted upon directly by the reflected radiation 28 of the mirror array 23, as indicated by the arrow 28. In addition, however, it is also exposed to the back radiation, indicated by the arrow 61, from the cavity-type solar heater 4.

In both embodiments according to FIG. 3, the radiation heat exchanger 50 is a flat structure which is disposed in ring-fashion in the plane of the radiation input opening 29. Its width is about one-third of the radiation input opening, which in practice is about 6 m.

Figure 4:
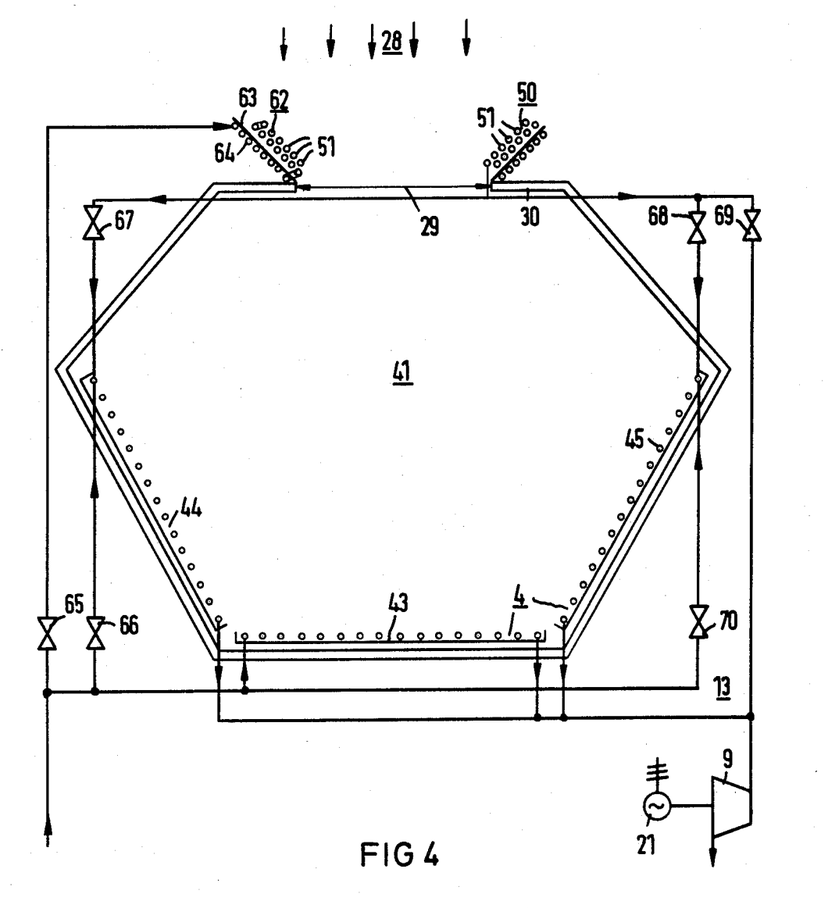
FIG. 4 is a cross-sectional view similar to FIG. 3 with a schematic circuit diagram for controlling the internal radiation cavity by the external radiation heat exchanger.

In agreement with FIG. 3, the embodiment example according to FIG. 4 includes a cavity 41 with three tube walls 43, 44, 45 which are disposed with a U-shaped cross section and are acted upon through the radiation input opening 29 in the cavity wall 30. The radiation heat exchanger 50 associated with the radiation input opening 29 again includes a two-layer bundle 62 of tubes 51 which are disposed offset to each other. However, the layers are not disposed in the plane of the radiation input opening 29 but are formed at an angle thereto, as can be seen in FIG. 4, showing the horizontal section through the center of the radiation input opening 29. A three-dimensional, i.e., spatial arrangement of the radiation heat exchanger 50 is therefore obtained.

FIG. 4 further shows that a large-area element 63 is associated with the two-layer tube bundle 62. The element 63 acts as a reflection or, if applicable, as a scattering surface, and possibly also as a heat-conducting surface for the radiation, which passes the tubes 51 or emanates therefrom. The large area element 63 is formed of metal and has tubes 64 in heat-conducting contact on the side thereof facing away from the tube bundle 62, which may be connected to tubes 51 to form a common cooling loop.

It is further seen from FIG. 4 that the radiation heat exchanger 50 can be coupled into the coolant loop of the solar heater 4 in different ways. The radiation heat exchanger 50 can be connected in parallel or in series with the tube walls 44 and 45 of the legs of the solar heater 4 depending on which of the six valves 65 to 70 are open or closed. In this way the asymmetrical exposure of the solar heater 4 which varies during the day can be compensated. A reduction of the thermal stresses and a more uniform output temperature for the coolant stream of the different tube walls 44, 45 are thereby achieved.

Figures 5, 6:
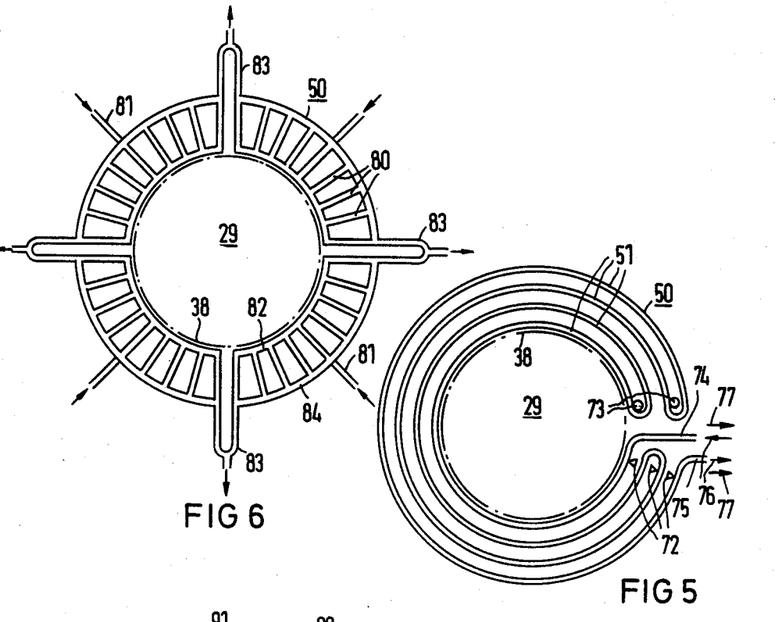
FIG. 5 is a diagrammatic elevational view of the tube bundle of a radiation heat exchanger with a flow direction parallel to the edge of the radiation input opening.
FIG. 6 is a view similar to FIG. 5 of a tube bundle of a radiation heat exchanger with a flow direction substantially transverse to the edge of the radiation input opening.

FIG. 5 shows, in a simplified manner, that the radiation heat exchanger 50 associated with the radiation input opening 29 includes a bundle of tubes 51 which are connected in series to form a single coolant loop. The tubes 51 are fitted to the edge 38 of the radiation input opening 29 shown in dot-dash lines, and are parallel thereto. The tubes 51 are rigidly secured at one end thereof by means of fixation points 72. At the other ends, sliding points 73 are provided for fastening, so that the tubes 51 can expand without impediment in their lengthwise direction when heated up.

FIG. 5 also diagrammatically shows that the coolant can be admitted to the connecting lines 74 and 75 of the radiation heat exchanger 50 with reversible direction of flow. Therefore air, for instance, can be made to flow as a gaseous coolant through the radiation heat exchanger 50 in such a way that it is transported from the region near the edge to the region further removed from the edge, before it leaves the radiation heat exchanger 50. Maximum cooling is achieved in this way; i.e. the heat absorption in the region near the edge is maximized. After switching over, however, the coolant can also first flow in the tubes 51 that are removed from the edge and then through these toward the region near the edge, before it leaves the region near the edge with the highest possible temperature. The average direction of the tubes 51 is parallel to the edge 38 in both cases, as already mentioned.

In the embodiment example according to FIG. 6, on the other hand, the radiation heat exchanger 50 is constructed in such a way that the tubes 80 extend transversely to the edge 38, which is indicated in dot-dash lines with a length corresponding to the width of the ring area. With the circular shape of the opening 29 as indicated, the tubes 80 are radial. According to the arrows in FIG. 6, there are provided inlet lines 81 that lead to the part near the edge of the radiation heat exchanger 50, which is represented by the manifold 82. The discharge lines 83 are associated with a manifold 84 spaced away from the edge. The manifold 84 confines the ring area toward the outside, which is covered by the radiation heat exchanger 50 that surrounds the edge 38 of the radiation input opening 29. This further shows that in this embodiment as well the width of the radiation heat exchanger is far more than one-tenth of the inside width of the radiation input opening 29, as given by the diameter. In the embodiment according to FIG. 6, the width of the ring area is again about one-third of the diameter.

Through the feed and discharge lines 81, 83, which incidentally can also be used for the reverse flow direction, a quadrant-wise sub-division of the ring area of the radiation heat exchanger 50 is obtained in the embodiment example according to FIG. 6, which is advantageous for compensating thermal expansion. Instead, or in addition thereto, compensators in the form of metal bellows can also be used for compensating thermal expansion.

Figure 7:
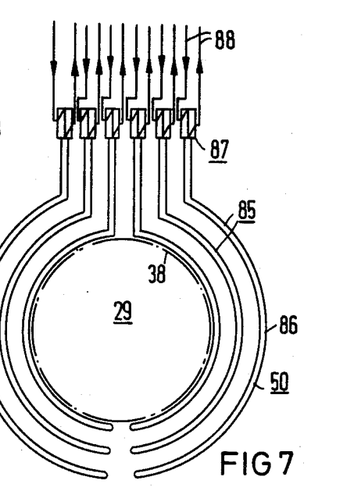
FIG. 7 is a view similar to FIGS. 5 and 6 of an embodiment of the radiation heat exchanger with heat pipes.

FIG. 7 diagrammatically indicates the use of heat pipes 85 as elements of a radiation heat exchanger 50. The heat pipes 85 with their evaporator zone 86 are parallel to the edge 38 of the radiation input opening 29 that is again indicated by dot-dash lines. The condensation zone associated with a heat exchanger 87 is disposed above the evaporator zone 86. Contrary to the appearance of the view in FIG. 7, it is angled off from the plane of the evaporator zone, so that the heat exchangers 87 lie "behind" the evaporator zone 86, i.e., in the shadow zone of this zone, relative to the reflected radiation 28 incident perpendicularly to the plane of the drawing. The usable heat which can be taken out by the secondary lines 88 of the heat exchangers 87 is again coupled into the cooling loop of the solar heaters 4, 5. However, it could also be given off to the feed water which flows through the steam generator 14 according to FIG. 1. Various possibilities for decoupling into the steam process of the solar-tower power station for this purpose will be described hereinbelow, referring to FIG. 9.

Figure 8:
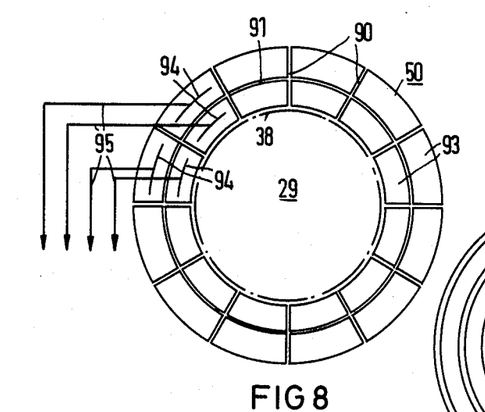
FIG. 8 is a view similar to FIGS. 5-7 of a possible subdivision of a ring area associated with a radiation heat exchanger.

FIG. 8 shows that the ring area of the heat exchanger 50 surrounding the radiation input opening 29 can be subdivided along parting lines 90 which are radially directed in the embodiment example, and more generally are transverse to the edge 38. Another possibility for a subdivision is indicated by a parting line 91 which extends parallel to the edge 38, or more generally along the edge, so that segments are produced.

The parting lines 90 and 91 may, for instance be expansion gaps in metallic or ceramic surfaces, which are associated with the tubes of the heat exchanger 50. Selectively absorbing and emitting coatings may be added to the surfaces of the tubes. This can likewise be in the form of a subdivision of a glass cover of the radiation heat exchanger described in connection with FIG. 3. Finally, the subdivision, provided by the individual sectors and segments of the ring area of the radiation heat exchanger 50 forming sections 93 can also be understood to be in the form of individual tube bundles, which are connected differently in series or in parallel by suitable connected lines with controlled valves for optimum utilization of the different radiation intensities, for optimizing the efficiency of the heat absorption.

It is further indicated in FIG. 8 that a tube 94 in the form of a measuring line is associated with each section 93 of the radiation heat exchanger 50. In the embodiment example the tube 94 is situated in the central portion of each section 93. The tube 34 is provided with suitable sensors for temperature and mass flow rate, so that the heat absorption can be determined to allow the measurement of the local radiation intensity. These may be in the form of photo-elective semiconductor elements or solar cells which can be force-cooled by the tubes 51. The electrical measurement value(s) of the sensors is(are) then transmitted through lines 95 to a process computer, which is not specifically shown. The process computer can optimize the coupling of the solar heat striking the edge area and can thereby optimize the efficiency of the sun-tower power station by controlling the individual sections 93 of the radiation heat exchanger 50.

In addition, the same process computer can influence the control of the individual mirrors 24, 25, 26, so that the radiation striking the edge area does not exceed the desired value and/or optionally a permissible limit. In the event of an accident, for instance, or of a failure of the coolant supply or the positioning devices of the mirrors 24 to 26, the process computer can also initiate auxiliary measures. For this purpose, the radiation heat exchanger can be operated with increased coolant flow, for instance, in case of overheating.

In the case of a coolant failure, the auxiliary measures triggered through measuring lines or tubes 94 or initiated directly in the event of accidents may further include directing the reflected radiation 28 away from the area of the tower 1 by moving the mirrors 24, 25, 26. In some circumstances, another coolant source can also be taken into operation.

The measuring lines 94 can be used for determining the total radiation power of the mirror array if the relationship of the radiation entering the cavity 41 through the radiation input opening is known in relation to the radiation 40 which acts on the radiation heat exchanger 50. For this purpose, the entire radiation heat exchanger can also be used.

Figure 9:
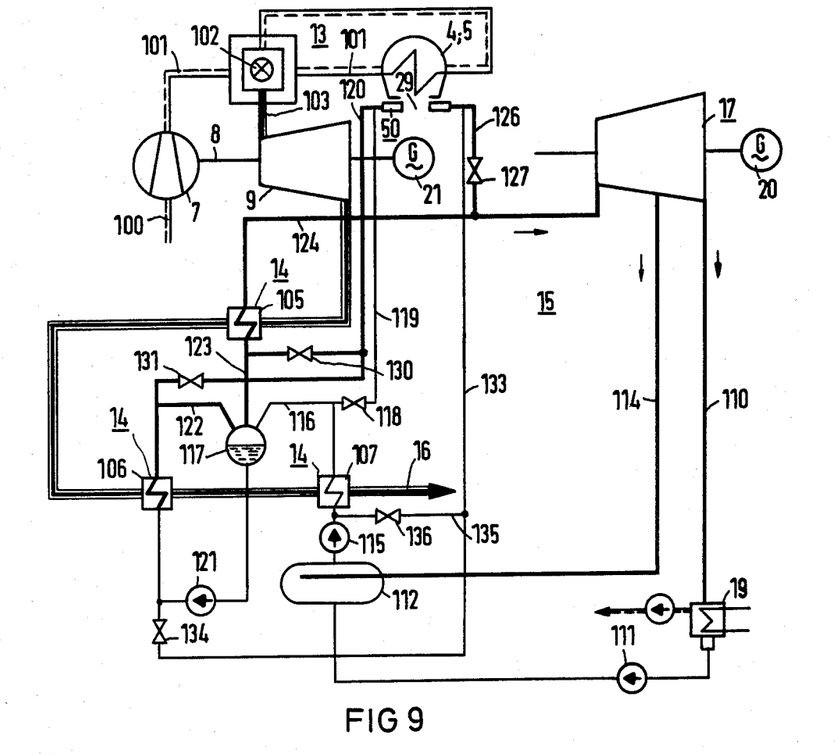
FIG. 9 is a diagrammatic and schematic circuit diagram of an example of a circuit for possible coupling of the useful heat obtained in a radiation heat exchanger into a gas or steam process.

FIG. 9 shows a piping diagram of the solar-tower power plant of FIG. 1, from which the different coupling possibilities for the radiation heat exchanger 50 for utilizing its usable heat in the existing gas and steam circuits 13, 15 can be seen.

The shaft 8 of the gas turbine 9 drives the compressor 7, which draws atmospheric air with a suction line 100 and pushes it from its outlet side through a line 101 into a combustion chamber for supplemental fossile firing. Behind or downstream of the combustion chamber 102, the pressure line 101 leads to the cavity-type solar heater 4, 5 and from there with the line branch 103 to the gas turbine 9 which is operated at 8 bar and 800° C. The expanded hot gas leaving the gas turbine 9 at 380° C. then passes through the heat exchanger 14 which, according to FIG. 9, is constructed with three parts.

The first part 105 of the heat exchanger 14 acts as a superheater. The second part 106 of the heat exchanger 14 serves as the evaporator. After a third part 107 of the heat exchanger 14, which acts as a preheater, the air, that is cooled down to 105° C., leaves the solar-tower power plant through the discharge line 16 into the atmosphere.

The steam turbine 17 with the generator 20 has two stages. An outlet line 110 leads from the low-pressure part to the condenser formed by the dry cooling tower 19. From the tower 19, the feedwater is conducted by a pump 111 to a feedwater tank 112. A discharge line 114 of the high-pressure part is also conducted into the feedwater tank 112. The line 114 can serve as the tap line for pre-heating the feedwater.

From the feedwater tank 112, the feedwater can be pumped by a pump 115 into the preheater 107. The preheater, in turn, is connected by a line 116 to a steam drum 117. It is further connected by way of a valve 118 and a line branch 119 to the connecting line 120 of the radiation heat exchanger 50.

From the drum 117, a pump 121 can pump feedwater at saturation temperature into the evaporator 106. The evaporator 106 is in turn connected by a line 122 to the steam space of the drum 117, to which the superheater 105 is connected through a line 123. From the superheater 105, the hot-steam line 124 leads to the steam turbine 17.

The radiation heat exchanger 50 is connected, on the one hand, to a line branch 126, having a valve 127, which leads to the hot-steam line 124. The line 120 is connected through a valve 130 to the line 123. A further valve 131 closes off the connection to the line 122. The line 126 is connected by a line 133 with a valve 134 to the output side of the pump 121, and by a line branch 135 with a valve 136 to the outlet side of the pump 115.

With the depicted construction of the connecting lines, the radiation heat exchanger 50 can be switched into the steam loop 15 of the steam turbine 17 in different ways, depending on its temperature. If, for instance, the valves 136 and 118 are opened, the radiation heat exchanger 50 is acted upon by feedwater in operation parallel to the preheater 107; the feedwater is conducted by the feedwater pump 115 through the line branch 133 into the radiation heat exchanger and flows through lines 119 and 116 into the drum 117. The input temperature of the feedwater flowing into the radiation heat exchanger 50 is then, for instance, only 50° C.

If the valve 134 is opened simultaneously with the valve 131, the radiation heat exchanger 50 can operate in parallel with the evaporator 106, because it is acted upon by the pump 121 and supplies steam through the valve 131 into the line 122. The steam temperature after the radiation heat exchanger 50 can then be about 150° to 200° C.

Finally, the radiation heat exchanger 50 can also be operated as a superheater by opening the valves 130 and 127. Then it is supplied with steam from the drum 117, which is then given off directly into the hot-steam line 124. In this operation the end temperature after the radiation heat exchanger 50 is, for instance, 350° C.

As shown in FIG. 4, it is also possible to couple the radiation heat exchanger 50 at the radiation input opening 29 into the gas loop 13 if sufficiently high temperature between, for instance, 500° and 800° C. can be reached thereby. In view of the shielding effect which may be intended by the radiation heat exchanger 50 for the structure of the sun-tower power station, the low temperatures of the steam loop 15 may, however, be better suited for heat removal, i.e., the utilization of the solar heat by the radiation heat exchanger 50.

What is claimed is:

1. Solar-tower power plant comprising a tower having a base and an upper end, an array of mirrors disposed around said base of said tower, a non-reflective cavity-type solar heater being disposed at said upper end of said tower and having a cavity formed therein defining a wall adjacent to said cavity, said cavity wall having a radiation input opening formed therein defining a non-reflective edge of said cavity wall, said solar heater being heatable by radiation reflected and concentrated by said mirror array and received through said radiation input opening, a coolant conduit connected to said solar heater for utilizing radiation heat therefrom, a radiation heat exchanger having tubes and being connected to said coolant conduit, the tubes of said radiation heat exchanger being disposed in a ring around said non-reflective edge of said cavity wall outside said cavity wall facing said mirror array means having a surface area disposed in vicinity of said tubes and facing said cavity wall for influencing heat transfer to said tubes at least by at least one of heat conduction and back radiation, said radiation heat exchanger having a highly temperature resistant glass cover being disposed on the tubes of said radiation exchanger for reducing convection losses, said glass cover having expansion gaps formed therein forming segments, and a lateral seal disposed on said glass cover, wherein said glass cover is highly permeable ins the visible radiation range, and including a selective coating disposed on at least part of said glass cover for reducing heat radiation and making said glass cover less permeable in the infra-red heat radiation range.

2. Solar-tower power plant accordance to claim 1, wherein the tubes of said radiation heat exchanger are adapted to the cross section of said radiation input opening and cover said edge of said cavity wall over a width of at least one-tenth of the diameter thereof.

3. Solar-tower power plant according to claim 1, wherein said tubes of said radiation heat exchanger are heat pipes.

4. Solar-tower power plant according to claim 3 wherein said heat pipes include a condensation and an evaporation zone, said condensation zone being disposed above said evaporation zone and out of the reflected radiation.

5. Solar-tower power plant according to claim 1, including photo-electric semiconductor elements disposed in vicinity of the tubes of said radiation heat exchanger.

6. Solar-tower power plant according to claim 5, wherein said semiconductor elements are forced-cooled by said tubes of said radiation heat exchanger.

7. Solar-tower power plant according to claim 1, including means for compensating expansion of said tubes of said radiation heat exchanger and means for securing said tubes.

8. Solar-tower power plant according to claim 7, including ring elements surrounding said edge of said cavity walls, said large-area elements being subdivided by expansion gaps formed therein.

9. Solar tower power plant according to claim 1, wherein said tubes of said radiation heat exchanger are disposed around said input opening in the form of a three-dimensional spatially-curved ring surface.

10. Solar-tower power plant according to claim 1, wherein said tubes of said radiation heat exchanger are disposed in a plurality of layers offset relative to each other.

11. Solar-tower power plant according to claim 1, wherein said tubes of said radiation heat exchanger are combined in a tube bundle extended parallel to said edge of said cavity wall.

12. Solar-tower power plant according to claim 1, wherein said tubes of said radiation heat exchanger are combined in a tube bundle extended transverse to said edge of said cavity wall.

13. Solar-tower power plant according to claim 1, including a ring area of said cavity wall adjacent to said edge thereof, said tubes of said radiation heat exchanger being combined into a plurality of tube bundles, each of said tube bundles covering a part of said ring area.

14. Solar-tower power plant according to claim 13, including means for selectively connecting said tube bundles for use as a preheater section and an evaporator section and a superheater section, depending on the temperature of coolant.

* * * * *

UNITED STATES PATENT AND TRADEMARK OFFICE
CERTIFICATE OF CORRECTION

PATENT NO. : 4,546,758
DATED : October 15, 1985
INVENTOR(S) : FRANCK EBERHARD

It is certified that error appears in the above-identified patent and that said Letters Patent are hereby corrected as shown below:

On the Title Page:

In the heading, item (75), line 4,

"Franck Ebernard" should read

--Franck Eberhard--.

Signed and Sealed this

Seventh Day of April, 1987

Attest:

DONALD J. QUIGG

Attesting Officer

Commissioner of Patents and Trademarks